United States Patent
Mannherz et al.

(10) Patent No.: US 10,023,170 B2
(45) Date of Patent: Jul. 17, 2018

(54) METHOD FOR BRAKING A VEHICLE

(71) Applicant: Robert Bosch GmbH, Stuttgart (DE)

(72) Inventors: Edith Mannherz, Untergruppenbach (DE); Tobias Putzer, Bad Friedrichshall (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 15/176,280

(22) Filed: Jun. 8, 2016

(65) Prior Publication Data

US 2016/0355171 A1 Dec. 8, 2016

(30) Foreign Application Priority Data

Jun. 8, 2015 (DE) .......... 10 2015 210 433

(51) Int. Cl.

| | |
|---|---|
| *B60T 17/22* | (2006.01) |
| *B60T 7/12* | (2006.01) |
| *B60W 30/06* | (2006.01) |
| *B60T 8/88* | (2006.01) |
| *B60T 13/74* | (2006.01) |
| *F16D 121/24* | (2012.01) |

(52) U.S. Cl.
CPC .............. *B60T 17/221* (2013.01); *B60T 7/12* (2013.01); *B60T 8/885* (2013.01); *B60T 13/741* (2013.01); *B60W 30/06* (2013.01); *B60T 2270/402* (2013.01); *F16D 2121/24* (2013.01)

(58) Field of Classification Search
CPC .......... B60T 13/74; B60T 13/741; B60T 7/12; B60T 8/885; B60T 17/221; B60W 30/06
USPC ....................................................... 701/97, 98
See application file for complete search history.

(56) References Cited

U.S. PATENT DOCUMENTS

| | | | | |
|---|---|---|---|---|
| 6,019,436 | A  * | 2/2000 | Siepker ..................... | B60T 7/12 188/106 F |
| 2002/0070693 | A1* | 6/2002 | Disser ..................... | B60T 7/042 318/34 |
| 2006/0180365 | A1* | 8/2006 | Innami ................. | B60K 7/0007 180/65.51 |
| 2008/0001470 | A1* | 1/2008 | Craig .................... | B60T 13/588 303/3 |
| 2008/0143179 | A1* | 6/2008 | Rutherford ............... | B60T 7/20 303/160 |
| 2010/0217488 | A1* | 8/2010 | Nijakowski ........... | B60T 17/221 701/48 |
| 2011/0005874 | A1* | 1/2011 | Beier ...................... | B60T 7/042 188/106 F |

(Continued)

FOREIGN PATENT DOCUMENTS

| | | | |
|---|---|---|---|
| DE | 10 2010 048 910 A1 | 4/2008 | |
| DE | 102011110892 B4 * | 7/2013 | ............ B60T 8/1755 |
| JP | 2001-010482 A | 1/2001 | |

OTHER PUBLICATIONS

EPO translation DE 10 2011 110892 B4, Jul. 2013.*
Proquest translation JP 2001-10482 A, Jan. 2001.*

*Primary Examiner* — Thomas J Williams
(74) *Attorney, Agent, or Firm* — Maginot, Moore & Beck LLP

(57) ABSTRACT

In the case of a method for braking a vehicle having a hydraulic vehicle brake and an electromechanical braking device, the brake motor of the electromechanical braking device is influenced with an increased supply voltage in the event of a failure of the hydraulic vehicle brake.

13 Claims, 3 Drawing Sheets

(56) References Cited

U.S. PATENT DOCUMENTS

| | | | |
|---|---|---|---|
| 2011/0168502 A1* | 7/2011 | Linhoff | B60T 13/588 |
| | | | 188/72.2 |
| 2011/0254357 A1* | 10/2011 | Vollert | B60T 1/10 |
| | | | 303/3 |
| 2016/0214595 A1* | 7/2016 | Baehrle-Miller | B60T 7/22 |

* cited by examiner

METHOD FOR BRAKING A VEHICLE

METHOD FOR BRAKING A VEHICLE

This application claims priority under 35 U.S.C. § 119 to application no. DE 10 2015 210 433.8, filed on Jun. 8, 2016 in Germany, the disclosure of which is incorporated herein by reference in its entirety.

BACKGROUND

The disclosure relates to a method for braking a vehicle that comprises a hydraulic vehicle brake and an electromechanical braking device having an electric brake motor that adjusts a brake piston against a brake disc.

It is known from DE 10 2006 048 910 A1 to monitor the function of the service braking system during a parking procedure and to actuate an automatic parking brake in lieu of the service braking system in the event of a malfunction. The automatic parking brake comprises an electric motor that influences a brake piston with a force so that said brake piston moves against a brake disc.

JP 2001 010482 A discloses an electrodynamic vehicle brake having an electric brake motor whose supply voltage is increased in the event of an emergency in order to decrease the rise time of the braking force.

SUMMARY

The method in accordance with the disclosure relates to braking a vehicle that is fitted with a braking system that on the one hand comprises a hydraulic vehicle brake and on the other hand comprises an electromechanical braking device having an electric brake motor. The electromechanical braking device having the brake motor is typically used as a parking or holding brake in order to generate a brake application force that secures the vehicle at a standstill. In the event of the electric brake motor being actuated, the rotational movement of the rotor of the brake motor is converted into an axial adjusting movement of a spindle by way of which a brake piston that is a carrier of a brake pad is pushed axially against a brake disc. The brake piston is preferably a brake piston of the hydraulic vehicle brake, said brake piston being influenced by means of the hydraulic braking pressure so that said brake piston moves against the brake disc.

The electromechanical braking device having the electric brake motor is preferably used in a low speed range below a threshold speed that is typical for parking procedures, in other words when parking the vehicle or when exiting a parking space. Fundamentally however, it is also possible to use said electromechanical braking device at higher speeds and/or independent of parking procedures.

In the case of the method for braking the vehicle, in the event of the hydraulic vehicle brake in part or entirely failing and it consequently not being possible to brake the vehicle by way of the hydraulic vehicle brake, the electric brake motor of the electromechanical braking device actuates so as to generate a braking force. In this case, the electric brake motor is influenced with a supply voltage that is increased with respect to the vehicle electrical network voltage. In the normal case, when using the electromechanical braking device as a parking brake or holding brake, the electric brake motor is influenced with the vehicle electrical network voltage as a supply voltage in order to continuously secure the vehicle at a standstill. During the parking procedure, the vehicle is braked to a standstill by way of the hydraulic vehicle brake either manually by way of a driver actuation or automatically by way of a parking assistant from low speed when parking the vehicle or when exiting a parking space. The holding brake or parking brake is subsequently actuated, said holding brake or parking brake being formed by the electromechanical braking device having the electric brake motor, in order to generate in a desired manner a braking force that continuously holds the vehicle at a standstill.

In contrast, the method in accordance with the disclosure engages in response to the failure of the hydraulic vehicle brake so that the vehicle cannot be braked to a standstill in an unusual manner by way of the vehicle brake. In the event of a complete failure of the hydraulic vehicle brake, it is not possible to generate a braking force and in the event of a partial failure of the hydraulic vehicle brake, the braking force that is generated is not sufficient to brake the vehicle in a sufficiently short time period.

In this situation, as long as the vehicle is still moving, the electromechanical braking device actuates and generates by way of the electric brake motor a braking force that brakes the vehicle. In order to reduce the time period prior to generating the braking force and/or to increase the braking force or to cause a sharper increase of the braking force the electric brake motor is influenced with the increased supply voltage that lies above the vehicle electrical network voltage. Accordingly, the electric brake motor runs at a higher rotational speed, which, depending upon the prevailing phase which the brake motor is in, leads to more rapidly overcoming the take up distance until the brake pad comes to lie on the brake disc, to a more rapid increase of the braking force and/or to a higher braking force level. As a consequence, the vehicle can in particular be decelerated in a shorter period of time, preferably brought to a standstill. Since the deceleration is preferably only performed in the event of a failure of the hydraulic vehicle brake and consequently only in an exceptional situation, electromechanical braking devices that typically are used as a parking brake or a holding brake can be used. An adjustment of the components, in particular of the electric brake motor to the increased supply voltage is not required owing to the exceptional nature since the affected components can withstand the temporarily increased load.

The increased supply voltage can already be generated where appropriate prior to a failure of the hydraulic vehicle brake. This has the advantage that in the event of the failure of the vehicle brake occurring, the increased supply voltage is available without delay so as to influence the electric brake motor.

The increased supply voltage, which lies above the vehicle electrical network voltage and with which the brake motor is generally influenced, can be made available during a specific phase or during multiple phases of the brake application procedure of the electric brake motor. In accordance with a preferred embodiment, the increased supply voltage is at least effective when overcoming the take up distance in the electromechanical braking device. When overcoming the take up distance, the brake piston that is the carrier of the brake pad covers the path between a starting position and applying the brake pad to the brake disc. In this phase, a braking force is not available by way of the electromechanical braking device. As a result of the electric brake motor being supplied in this phase with the increased supply voltage, the take up distance is covered in a shorter period of time so that accordingly the build-up of braking force also occurs over a shorter time period.

Alternatively or in addition thereto, it can be expedient to make the increased supply voltage available when building up the braking force in the electromechanical braking device. The build-up of braking force occurs after the brake pad makes physical contact with the brake disc and after a continuous actuation of the electric brake motor that presses the brake piston having the brake pad against the brake disc. If, in this phase, the electric brake motor is influenced with the increased supply voltage, the time to achieving a specific braking force level is decreased owing to the increased braking force gradient. In addition or alternatively, it is also possible to achieve a higher braking force level than with the regular vehicle electrical network voltage.

In accordance with a preferred embodiment, the increased supply voltage is applied during all phases, in other words both when overcoming the take up distance as well as after the brake pad has made physical contact with the brake disc with the accompanying build-up of the braking force.

In accordance with a further expedient embodiment, after terminating a defined phase of building up the braking force, the increased supply voltage is switched back to the vehicle electrical network voltage. This preferably occurs by way of the control logic of the electromechanical braking device so that, after terminating the actuation of the brake motor with the increased supply voltage and a subsequent renewed actuation, the electric brake motor is influenced with the lower vehicle electrical network voltage.

In a further expedient embodiment, the vehicle electrical network voltage is 12 V which is used as a starting point from which to switch to the vehicle electrical network voltage. The increased supply voltage is, in accordance with an advantageous embodiment, a maximum 20 V, which on the one hand leads to a higher brake application speed of the electric brake motor with respect to the vehicle electrical network voltage of 12 V and on the other hand the load for the components of the electromechanical braking device is limited to a measurement at which damage is not to be expected.

Various possibilities are taken into account for making the increased supply voltage available. In accordance with a first advantageous embodiment, the increased supply voltage is generated from the vehicle electrical network voltage with the aid of a DC converter. The DC converter can be integrated as an additional component into the controller. This renders it possible both to operate the electromechanical braking device with the vehicle electrical network voltage as the supply voltage and also, in the event of a failure of the hydraulic vehicle brake, with a supply voltage that is increased with respect to the vehicle electrical network voltage.

In accordance with a further expedient embodiment, the increased supply voltage is supplied from an electrical capacitor that is capable of temporarily storing and outputting energy. By way of example, capacitors in the embodiment could be supercapacitors or ultracapacitors having a sufficiently large capacity. By way of example, the capacitor is connected in series with respect to the current circuit between the vehicle electrical network and a controller electronic system of the electric brake motor. If the capacitor is charged by way of the vehicle electrical network, the voltage of said capacitor is identical to the vehicle electrical network voltage. The sum of the vehicle electrical network voltage and the capacitor voltage is available as the resulting voltage so that altogether the doubled vehicle electrical network voltage is available as the increased supply voltage. Where appropriate, the doubled vehicle electrical network voltage is transformed into a slightly reduced supply voltage, by way of example 20 V.

Where appropriate, the capacitor can also be used solely to supply energy for the electric brake motor in order to make an increased supply voltage available. In this case, the capacitor is connected between the regulating or controlling device of the controller device and the controller electronics system and delivers the increased supply voltage as required.

In accordance with a yet further expedient embodiment, the increased supply voltage originates from a second vehicle electrical network that comprises a higher vehicle electrical network voltage with respect to the first on board network. In the event of a failure of the hydraulic vehicle brake, the method switches to the vehicle electrical network voltage of the second vehicle electrical network as the increased supply voltage for the electric brake motor.

In accordance with a further embodiment variant, the increased supply voltage that lies above the vehicle electrical supply voltage is generated prior to the failure of the hydraulic vehicle brake if an activating condition is present. The activating condition is by way of example a specific driving maneuver, in particular an automatic parking procedure or a procedure exiting a parking space that is performed without the vehicle being actuated by means of the driver. If it is identified in the regulating or controlling device that such a case is present and consequently the activating condition is fulfilled, an increased supply voltage is thus supplied, said increased supply voltage lying above the vehicle electrical network voltage. However, as long as a failure of the hydraulic vehicle brake has not been established, the braking procedure is performed by said hydraulic vehicle brake. The vehicle is braked by way of the electromechanical braking device only in the event of a failure of the hydraulic vehicle brake, in particular in an emergency braking mode.

The various method steps for braking the vehicle are performed in a regulating or controlling device in the vehicle and adjusting signals for controlling the adjustable components of the braking system, in particular the electromechanical braking device, are generated in said regulating and controlling device.

BRIEF DESCRIPTION OF THE DRAWINGS

Exemplary embodiments of the disclosure are presented in the drawings an are explained in more detail in the description below.

In the drawings.

DETAILED DESCRIPTION

Figure 1:
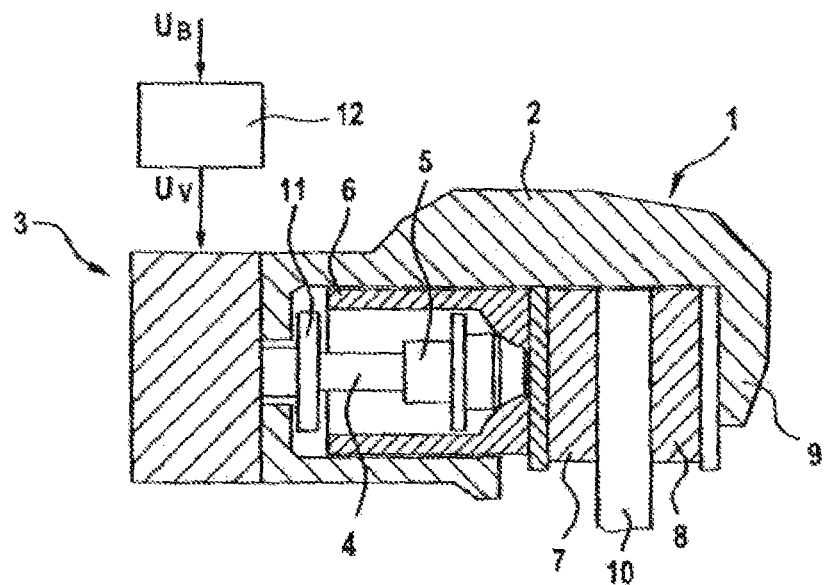
FIG. 1 illustrates a sectional view of an electromechanical braking device for a vehicle, in which the braking force is generated by way of an electric brake motor.

In the figures, parts that are of an identical construction and function in an identical manner are provided with identical reference numerals.

The electromechanical braking device 1 that is illustrated in FIG. 1 comprises a brake caliper 2 having a set of pincers 9 that grips over a brake disc 10. The braking device 1 that can be used as a holding brake or parking brake comprises a direct current electrical motor as a brake motor 3 as an adjusting member and the rotor shaft of said electric motor drives a spindle 4 in a rotating manner and a spindle nut 5 is mounted on said spindle in such a manner that said spindle nut can rotate. During a rotation of the spindle 4, the spindle nut 5 is adjusted in an axial manner. The spindle nut 5 moves within a brake piston 6 that is the carrier of a brake pad 7 that is pressed by the brake piston 6 against the brake disc 10. A further brake pad 8 is located on the opposite-lying side of the brake disc 10, said brake pad being held by the set of pincers 9 in such a manner that it cannot move out of place.

In the case of a rotational movement of the spindle 4, the spindle nut 5 can be moved within the brake piston 6 axially forwards in the direction of the brake disc 10 or in the case of a rotation of the spindle 4 in the opposite direction, said spindle nut can move axially to the rear until reaching a stop 11. The spindle nut 5 influences the inner end face of the brake piston 6 so as to generate a brake application force, as a result of which the brake piston 6 that is mounted in the electromechanical braking device 1 in such a manner that it can be displaced in an axial manner is pressed with the brake pad 7 against the end surface of the brake disc 10 that is facing the brake pad.

The brake motor 3 is also controlled by a controller device 12 in the vehicle. The controller device 12 that comprises a regulating or controlling device having a controller logic, a controller electronic system and also where appropriate further electronic components provides a supply voltage $U_V$ as an output and the electric brake motor 3 is influenced with said supply voltage.

The electromechanical braking device 1 and a hydraulic vehicle brake that is used during a regular braking operation to brake the vehicle both act upon the brake piston 6. In the case of an actuation of the hydraulic vehicle brake, the rear face of the brake piston 6 that is facing the brake motor is influenced with a hydraulic fluid that is under pressure.

Figure 2:
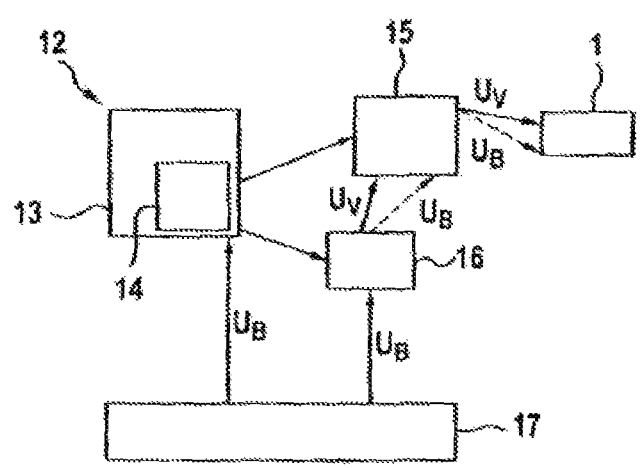
FIG. 2 illustrates the construction of the controller device for controlling the electromechanical braking device with an increased supply voltage that is provided by way of a DC converter.

FIG. 2 illustrates the construction of the controlling device 12 for controlling the electric brake motor of the electromechanical braking device 1. The controller device 12 comprises a regulating or controlling device 13 that can be the control device of the electronic stability program (ESP) and that comprises a controller logic 14 and also furthermore comprises a controller electronics system 15 and a DC converter 16. The controller electronics system 15 that comprises a power electronics system is controlled by the regulating or controlling device 13, likewise the DC converter 16. The controller electronics system 15 influences the electric brake motor of the braking device 1 with a desired supply voltage $U_V$.

Both the regulating or controlling device 13 as well as the DC converter 16 are connected to the vehicle electrical network 17 that by way of example provides a vehicle electrical network voltage $U_B$ in the magnitude of 12 V.

In the normal case, the electromechanical braking device 1 is used to generate a clamping force after the vehicle has come to a standstill in order to continuously secure the vehicle in one place. In this case, the electric brake motor in the electromechanical braking device 1 is influenced with the vehicle electrical network voltage $U_B$ as a supply voltage.

However, if a failure of the hydraulic vehicle brake is established, in particular during a parking procedure so that it is not possible to brake the vehicle or it is not possible to brake the vehicle with sufficient safety by way of the hydraulic vehicle brake, the vehicle is thus alternatively braked by way of the electromechanical braking device 1. In order to accelerate the braking procedure, the electric brake motor is influenced with an increased supply voltage $U_V$ that is higher than the vehicle electrical network voltage $U_B$. The increased supply voltage $U_V$ by way of example is at 20 V.

The lower vehicle electrical network voltage $U_B$ is transformed to the increased supply voltage $U_V$ in the DC converter 16. This is performed after controlling by means of the regulating or controlling device 13. In contrast, if there is no failure of the hydraulic vehicle brake, the control is performed in the manner that the vehicle electrical network voltage $U_B$ is guided in such a manner by means of the DC converter 16 without transformation so that the supply voltage $U_V$ with which the electric brake motor is influenced corresponds to the vehicle electrical network voltage $U_B$.

Figure 3:
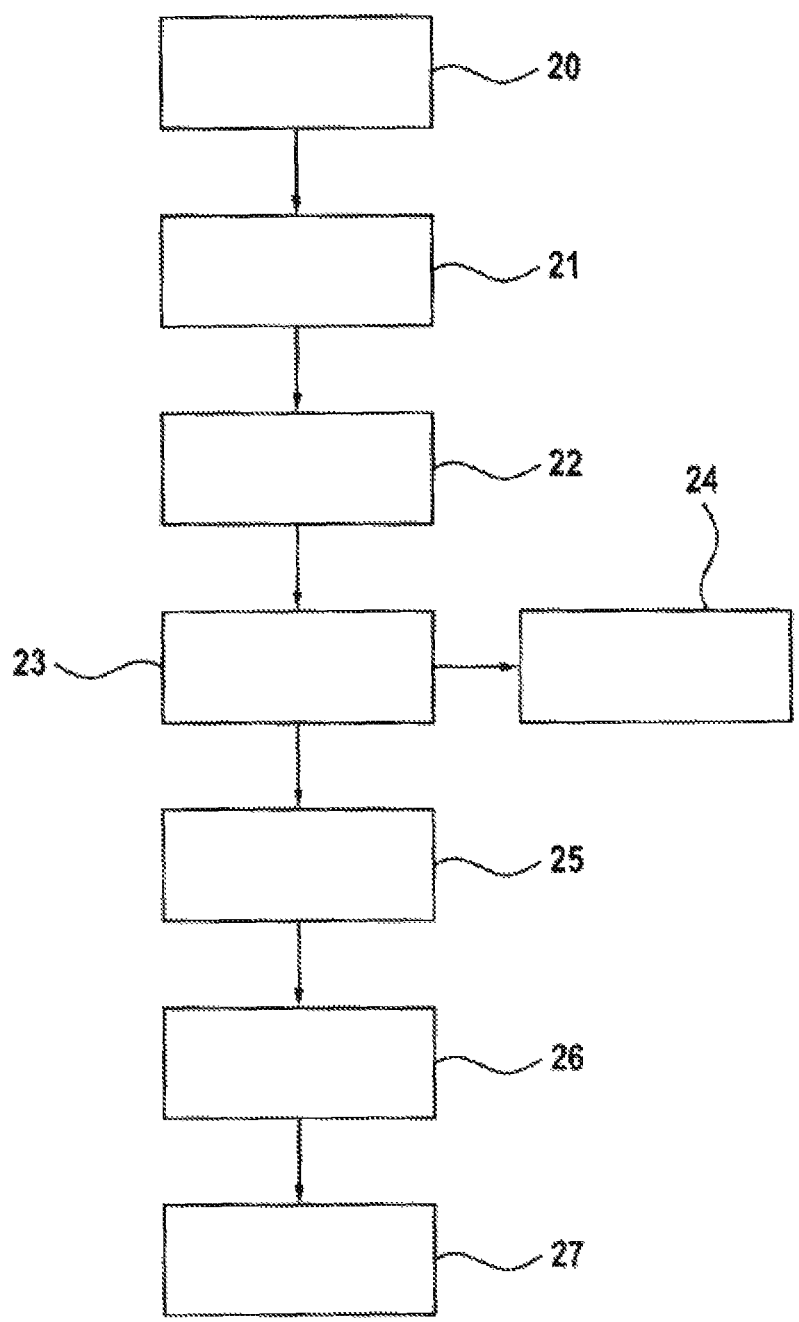
FIG. 3 illustrates a flow chart having method steps for braking a vehicle by means of an electromechanical braking device whose brake motor is influenced with an increased supply voltage.

FIG. 3 illustrates a flow chart for an automated parking procedure in a vehicle during which owing to the failure of the hydraulic vehicle brake, the method switches to a braking operation by way of the electromechanical braking device.

At the beginning of the method, in a first step 20 a functional release is performed, by way of example for performing the automated parking procedure without the driver being actively involved. In the next step 21, for safety reasons an emergency stop mode is switched on in the regulating or control device, whereupon in step 22 an increased supply voltage for the electric brake motor of the electromechanical braking device is generated. In step 23, the automated parking procedure is performed, wherein braking procedures are performed by way of the hydraulic vehicle brake. However, in the event of a malfunction in the hydraulic vehicle brake, in particular a failure, in accordance with step 24 an emergency braking procedure is performed by means of activating the electric brake motor, the emergency braking procedure can be performed in a shorter period of time since the increased supply voltage is already available.

In contrast, if a malfunction in the hydraulic vehicle brake is not identified, the automatic parking procedure is performed in a regular manner, wherein upon terminating the parking procedure in accordance with step 25, the emergency stop mode is switched off and in step 26 the supply voltage of the electric brake motor is switched back to the vehicle electrical system voltage. To conclude the method, in step 27 the vehicle is secured and continuously held at a standstill by way of actuating the electromechanical braking device.

Figure 4:
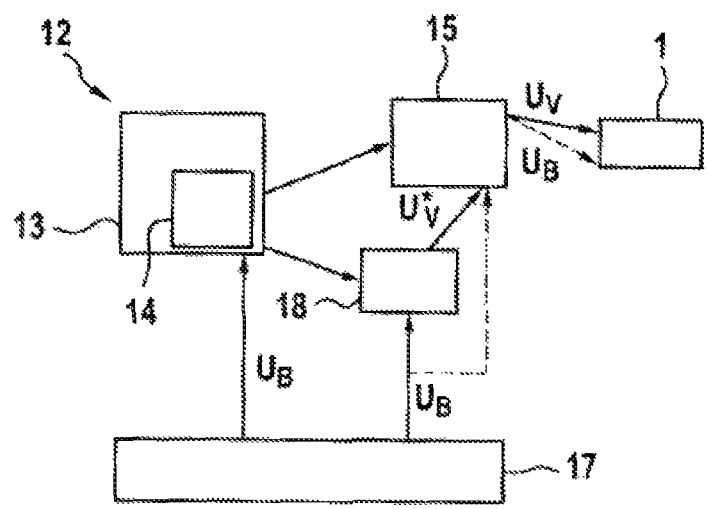
FIG. 4 illustrates a construction of a controller device corresponding to FIG. 2 however with an electrical capacitor, by way of which the increased supply voltage is provided.
Figure 5:
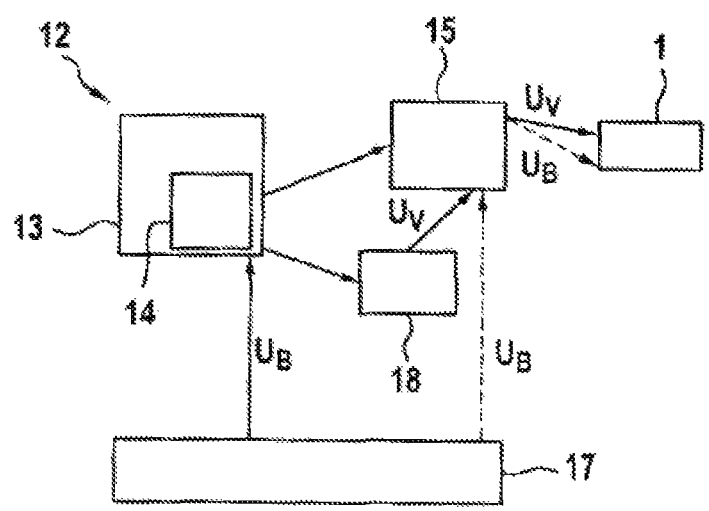
FIG. 5 illustrates a further construction of a controller device having an electrical capacitor for providing the increased supply voltage in a further embodiment.

FIGS. 4 and 5 in each case illustrate controller devices 12 for controlling the electric brake motor in the electromechanical braking device 1 that in contrast to the exemplary embodiment in accordance with FIG. 2 comprise a capacitor 18 in lieu of a DC converter and an increased supply voltage $U_V$ can be provided by way of said capacitor.

In accordance with FIG. 4, the capacitor 18 is connected in series in the current circuit of the electric brake motor in the braking device 1 and is located between the vehicle electrical network 17 and the controller electronics system 15 similar to the controller device 12 in accordance with FIG. 2. As a general rule, in the case of a functioning hydraulic vehicle brake, the electric brake motor in the braking device 1 is influenced with a supply voltage that corresponds to the vehicle electrical network voltage $U_B$. If a malfunction is established in the hydraulic vehicle brake, the electrical capacitor 18 is thus controlled by way of the regulating or control device 13, whereupon the capacitor 18 that is supplied by the vehicle electrical network $U_B$ generates an increased voltage $U_V^*$.

This increased voltage $U_V^*$ is twice as high as the vehicle electrical network voltage and is the sum of the vehicle electrical network voltage and the capacitor voltage that is identical to the vehicle electrical network voltage. In the controller electronics system 15, the increased voltage of 24 V is transformed (from a starting point of a vehicle electrical network voltage of 12 V) to a supply voltage of 20 V and the electric brake motor is influenced with said supply voltage.

In the exemplary embodiment in accordance with FIG. 5, the electrical capacitor 18 does not depend upon the vehicle electrical network 17 but rather is used as a stand-alone energy source. The capacitor 18 is pre-charged with a higher voltage that can be drawn upon as the increased supply voltage with by way of example 20 V as required so as to control the electric brake motor in the braking device 1. In the normal case, the electric brake motor is influenced with the vehicle electrical network voltage directly by way of the vehicle electrical network 17.

The method for braking the vehicle in the event of a failure of the hydraulic vehicle brake is also performed in the case of the controller devices 12 in accordance with FIGS. 4 and 5 in a corresponding manner as in the case of the controller device in accordance with FIG. 2 in accordance with the flow chart that is described in FIG. 3. In addition, however, it is necessary to ensure that the capacitor 18 is sufficiently charged prior to switching into the emergency stop mode.

What is claimed is:

1. A method for braking a vehicle including a hydraulic vehicle brake and an electromechanical braking device having an electric brake motor configured to adjust a brake piston against a brake disc, the method comprising:
   detecting that an automated driving procedure is being performed, the automated driving procedure being a procedure during which the vehicle one of (i) parks in a parking space and (ii) exits a parking space without the vehicle being actuated by a driver, the automated driving procedure including at least one braking procedure performed by the hydraulic vehicle brake;
   in response to detecting that the automated driving procedure is being performed, generating an increased supply voltage that is greater than a vehicle electrical network voltage; and
   in response to a failure of the hydraulic vehicle brake, driving the electric brake motor of the electromechanical braking device with the increased supply voltage to perform the at least one braking procedure of the automated driving procedure.

2. The method according to claim 1, wherein the electronic brake motor is only driven with the increased supply voltage when the vehicle is travelling at a speed that is below a threshold speed.

3. The method according to claim 1, the generating further comprising:
   operating a DC converter to convert the vehicle electrical network voltage to the increased supply voltage.

4. The method according to claim 1 further comprising:
   maintaining the increased supply voltage at least until a brake pad carried by the brake piston comes into contact with the brake disc.

5. The method according to claim 4 further comprising:
   maintaining the increased supply voltage while building up a braking force in the electromechanical braking device, after the brake pad has come into contact with the brake disc.

6. The method according to claim 1 further comprising:
   switching the supply voltage for the electromechanical braking device to the vehicle electrical network voltage, at the latest after terminating the at least one braking procedure of the automated driving procedure.

7. The method according to claim 1, wherein the vehicle electrical network voltage is 12 V.

8. The method according to claim 1, wherein the increased supply voltage is a maximum of 20 V.

9. The method according to claim 1, the generating further comprising:
   charging an electrical capacitor to the increased supply voltage using the vehicle electrical network voltage.

10. A regulating or controlling device for braking a vehicle including a hydraulic vehicle brake and an electromechanical braking device having an electric brake motor configured to adjust a brake piston against a brake disc, the regulating or controlling device comprising:
    a processor configured to (i) detect that an automated driving procedure is being performed, the automated driving procedure being a procedure during which the vehicle one of parks in a parking space and exits a parking space without the vehicle being actuated by a driver, the automated driving procedure including at least one braking procedure performed by the hydraulic vehicle brake, (ii) in response to detecting that the automated driving procedure is being performed, generate an increased supply voltage that is greater than a vehicle electrical network voltage, and (iii) in response to a failure of the hydraulic vehicle brake, drive the electric brake motor of the electromechanical braking device with the increased supply voltage to perform the at least one braking procedure of the automated driving procedure.

11. A vehicle comprising:
    a braking system comprising:
        a hydraulic vehicle brake;
        an electromechanical braking device having an electric brake motor configured to adjust a brake piston against a brake disc; and
        a regulating or controlling device configured to:
            detect that an automated driving procedure is being performed, the automated driving procedure being a procedure during which the vehicle one of parks in a parking space and exits a parking space without the vehicle being actuated by a driver, the automated driving procedure including at least one braking procedure performed by the hydraulic vehicle brake;
            in response to detecting that the automated driving procedure is being performed, generate an increased supply voltage that is greater than a vehicle electrical network voltage; and
            in response to a failure of the hydraulic vehicle brake, drive the electric brake motor of the electromechanical braking device with the increased supply voltage to perform the at least one braking procedure of the automated driving procedure.

12. The vehicle according to claim 11, wherein the increased supply voltage is supplied from a DC converter configured to convert the vehicle electrical network voltage to the increased supply voltage.

13. The vehicle according to claim 11, wherein the increased supply voltage is supplied from an electrical capacitor that is charged using the vehicle electrical network voltage.

* * * * *